(12) United States Patent
Zhang et al.

(10) Patent No.: US 12,168,264 B2
(45) Date of Patent: Dec. 17, 2024

(54) METHOD FOR LASER JOINING TWO BLANKS MADE OF ALUMINUM MATERIAL

(71) Applicant: AUTOTECH ENGINEERING S.L., Bizkaia (ES)

(72) Inventors: Weijie Zhang, Auburn Hills, MI (US); Michel Raphael Garcia, Auburn Hills, MI (US)

(73) Assignee: AUTOTECH ENGINEERING R&D USA INC., Auburn Hills, MI (US)

( * ) Notice: Subject to any disclaimer, the term of this patent is extended or adjusted under 35 U.S.C. 154(b) by 567 days.

(21) Appl. No.: 17/435,361

(22) PCT Filed: Mar. 3, 2020

(86) PCT No.: PCT/US2020/020804
§ 371 (c)(1),
(2) Date: Aug. 31, 2021

(87) PCT Pub. No.: WO2020/180871
PCT Pub. Date: Sep. 10, 2020

(65) Prior Publication Data
US 2022/0152735 A1    May 19, 2022

Related U.S. Application Data

(60) Provisional application No. 62/814,199, filed on Mar. 5, 2019.

(51) Int. Cl.
*B23K 26/244*    (2014.01)
*B23K 26/0622*   (2014.01)
(Continued)

(52) U.S. Cl.
CPC ........ *B23K 26/244* (2015.10); *B23K 26/0622* (2015.10); *B23K 26/0734* (2013.01);
(Continued)

(58) Field of Classification Search
CPC .............. B23K 26/244; B23K 26/0734; B23K 26/0876; B23K 26/32; B23K 26/0622; B23K 2103/10
See application file for complete search history.

(56) References Cited

U.S. PATENT DOCUMENTS

2017/0368635 A1* 12/2017 Hanschmann ....... B23K 26/082
2018/0009060 A1*  1/2018 Yang ................. B23K 26/0626
(Continued)

FOREIGN PATENT DOCUMENTS

CN    108436270 A  *  8/2018  .......... B08B 7/0042
DE    202014105648 U1   12/2014
(Continued)

OTHER PUBLICATIONS

International Search Report and Written Opinion mailed Jun. 9, 2020 for PCT Application No. PCT/EP2020/020804, 14 pages.

*Primary Examiner* — Thien S Tran
(74) *Attorney, Agent, or Firm* — Squire Patton Boggs (US) LLP (57) ABSTRACT

The present invention relates to a method for joining two blanks made of aluminum material, using a laser source, by controlling the laser power distribution. In particular, the method comprises placing the first and second blanks for welding; laser welding the first and second blanks following a welding path and modulating a laser power distribution, wherein the welding path combines a linear movement along a welding direction and oscillating movements substantially transverse to the welding direction, wherein the oscillating movement has a frequency between 50 Hz and 1500 Hz and an amplitude ranging from 0.3 mm and 3.0 mm, and wherein the laser power distribution is dynamically controlled during the oscillating movement, and wherein said power is modulated between 0 and 100% of the maximum laser power. The (Continued)

present invention also related to a process of modulating said laser powder distribution.

19 Claims, 8 Drawing Sheets

(51) Int. Cl.
    *B23K 26/073*     (2006.01)
    *B23K 26/08*     (2014.01)
    *B23K 26/32*     (2014.01)
    *B23K 103/10*     (2006.01)

(52) U.S. Cl.
    CPC .......... *B23K 26/0876* (2013.01); *B23K 26/32* (2013.01); *B23K 2103/10* (2018.08)

(56) References Cited

U.S. PATENT DOCUMENTS

| | | | |
|---|---|---|---|
| 2018/0021888 A1* | 1/2018 | Liu | B23K 26/035 219/121.64 |
| 2019/0118299 A1* | 4/2019 | Kangastupa | B23K 26/322 |

FOREIGN PATENT DOCUMENTS

| | | | | |
|---|---|---|---|---|
| JP | S-54101596 A | * | 8/1979 | |
| JP | 2006122969 A | * | 5/2006 | ......... B23K 26/0069 |
| WO | WO 97/04916 A1 | | 2/1997 | |
| WO | WO 2016/118555 A1 | | 7/2016 | |
| WO | WO 2018/017926 A1 | | 1/2018 | |
| WO | WO-2018011456 A1 | * | 1/2018 | ......... B23K 26/0604 |

* cited by examiner

Transverse cross-section temperature field
evolution in one period at x=44mm

METHOD FOR LASER JOINING TWO BLANKS MADE OF ALUMINUM MATERIAL

CROSS-REFERENCE TO RELATED APPLICATIONS

The present application is a National Stage filing under 35 U.S.C. § 371 of International Patent Application No. PCT/US2020/020804, filed Mar. 3, 2020, which claims the benefit of and priority to US provisional patent application 62/814,199 filed on Mar. 5, 2019, both applications are incorporated by reference herein in their entirety for all purposes.

The present application claims the benefit of U.S. provisional application 62/814,199 filed on Mar. 5, 2019.

The present invention relates to a method for joining two blanks or components made of aluminum. In particular, the present invention relates to methods for remote laser welding aluminum blanks.

BACKGROUND

The use of aluminum in structures and particularly lightweight structures can be attractive for aluminum's high strength to weight ratio. The use of aluminum is already widespread in aircraft manufacturing and its use in automotive applications is increasing.

The aforementioned strength to weight ratio is key in this respect. Since aluminum is significantly lighter than steel, thickness of aluminum panels or components may be increased to improve e.g. energy absorption while still keeping the advantage of weight reduction. Moreover, specific aluminum alloys offer good formability making aluminum attractive for outer and inner panels of hang-on parts (e.g., doors, trunk lid) and for body-in-white (BIW) applications.

Body-in-white as used throughout the present disclosure may be interpreted as the structural framework of a vehicle (excluding e.g. the chassis, engine) designed to withstand all loads that the vehicle may be subjected to during its lifetime. The structural skeleton is further designed to withstand and absorb impacts, in case of e.g. collisions with other cars or obstacles.

The structural skeleton of a vehicle, e.g. a car, in this sense may include e.g. bumpers, pillars (A-pillar, B-pillar, C-pillar, D-pillar), side impact beams, rockers or sills, hinge pillars and shock absorbers.

An aluminum alloy as used throughout the present disclosure may be regarded as an alloy in which aluminum (Al) is the predominant metal. Typical alloying elements include e.g. copper, magnesium, manganese, silicon, tin and zinc. Aluminum alloys may be selected for corrosion resistance, strength, durability, extrusion properties etc.

One challenge related to the use of aluminum in automotive application is the joining of blanks or components to other blanks or components. It is known to use remote laser welding for joining aluminum blanks or components. Problems that are frequently encountered when using remote laser welding to join aluminum blanks or sheets are the porosity and the formation of hot cracks, which reduce the strength of the resultant weld.

Porosity of the weld occurs when gas bubbles get trapped in the weld. Hot cracks are also known as solidification cracks and occur when the available supply of liquid weld metal is insufficient to fill the spaces between solidifying weld metal. The occurrence of these problems can increase with an increase in weld speed, i.e. they occur more frequently if the throughput of an industrial process is to be increased.

Both porosity and hot cracks can reduce the strength of the weld and thereby the strength of the resultant product.

A known solution to this problem is the use of an appropriate filler material, i.e. during welding, a filler with a specific chemical composition and usually in the form of a filler wire, is added to the weld pool. However, the use of a filler wire increases the cost of joining.

WO 2018/017926 discloses systems and methods of a laser welding device to weld aluminum. The device includes a laser generator to generate welding-type lasing power and a lens to focus the welding-type lasing power at a focal point on an aluminum workpiece to generate a weld puddle. The device further includes a laser scanner to control the lens to move the focal point of the welding-type lasing power in multiple dimensions over the aluminum workpiece during welding. The laser generator and the laser scanner perform the welding without filler metal being added to the workpiece.

WO 2016/118555 relates to laser welding for joining two metal materials with a fillet joint. The method aims to compensate for geometry tolerances between the two materials. The method includes oscillating a laser beam, for example in a "figure 8" pattern, while moving the laser beam laterally along an interface between the two materials. The width of the fillet joint is increased compared to the fillet joint that would be formed using a non-oscillating laser beam, and thus compensates for the tolerances. The width of the fillet joint depends on the oscillation amplitude of the laser beam, rather than the beam size.

Both these prior art documents rely on an oscillating movement of the weld spot to provide for sufficient mixing throughout the weld pool with an objective of reducing weld defects, in particular cracks.

It is an object of the present disclosure to further improve methods for remote laser welding aluminum materials, and in particular in lap joints, which can provide good quality welds (with few or no defects such as porosity and hot cracks) at high productivity.

It is a further object to provide welding methods and systems that use a relatively low heat input and have a relatively small heat affected area.

SUMMARY

In a first aspect of the present invention, a method for joining a first blank and a second blank is provided, wherein both the first and the second blanks are made of aluminum alloy. The method comprises placing the first and second blanks for welding, the second blank being placed on top of the first blank and partially overlapping the first blank The method further comprises laser welding the first and second blanks following a welding path and modulating a laser power distribution, wherein the welding path combines a movement along a welding direction and oscillating movements substantially transverse to the welding direction, wherein the oscillating movement has a frequency between 50 Hz and 1500 Hz and an amplitude ranging from 0.3 mm and 3.0 mm. And laser power is varied along the welding path, wherein the laser power is varied such that accumulated heat in points along the welding path is substantially constant.

In accordance with this aspect, the laser power distribution is dynamically controlled during the oscillating movement, and the power may be modulated between 0 and 100% of the maximum laser power.

It has been found that hot cracks can be reduced or completely avoided by controlling the accumulated heat in each point along the weld path. By combining the oscillating movement of the welding path and the laser power distribution, an improved quality of the resulting weld seam is secured thus reducing or even eliminating hot cracks without using any filler wire.

Moreover, the penetration depth of the welding can be controlled as well as the joint cross section geometry. The high flexibility of defining the parameters used in the present invention enables the control of the seam's strength and the heat affected area thus improving the quality of the welding while eliminating the hot crack of the welded component.

Accumulated heat being substantially constant may preferably mean that the accumulated heat in simulation or in actual welding varies less than 20% around a mean value along at least 75% of the welding path. And more preferably means that the accumulated heat in simulation or in actual welding varies less than 15% around a mean value along at least 85% of the welding path.

In some examples, the accumulated heat in a point of the welding path may be determined as a function of a thickness of material in the point and the speed of the laser in the point.

The instantaneous speed of the laser spot at any given moment is a combination of an oscillation transverse to the weld direction, and a movement along the weld direction. The inventors have found that, even with an oscillating movement, problems such as cracks can still occur, and this is at least partly due to an inhomogeneous distribution of heat throughout the weld pool. The inhomogeneous distribution of heat is at least partly caused by a difference in instantaneous speed of the spot. By varying the laser power as a function of instantaneous speed of the laser spot, the heat distribution can be more homogeneous and the chances of the occurrence of hot cracks reduced.

By furthermore taking the thickness of material at any point along the welding path into account, the different heat conduction and distribution that occurs along different points of the weld path can be compensated for. In a lap joint, along part of the weld path there is more material to be heated below the laser spot, than along other parts. In the portions of the weld path wherein the blanks overlap (the portions where the second blank is positioned on top of the first blank), the material to which the laser heat may be distributed may be assumed to be double the amount of material in the portions wherein the laser spot touches upon the first blank only. Different assumptions of the amount of material to which heat may be distributed may be made, depending e.g. on different conductivities of materials (if the first and second blanks are not made of the same aluminum alloy), and depending on the direction/orientation of the laser.

The oscillating motion of the laser spot also gives an additional stirring effect upon the metal liquid in the weld puddle, which further facilitates to form a less inhomogeneous thermal profile the weld pool.

In specific examples, the product of speed and laser power and divided by local thickness may be maintained substantially constant during welding. In these examples, the product of instantaneous speed and laser power at any point will have only a small variation with respect to an average value, i.e. a variation of this value of less than 20%, and preferably less than 15% around the average value. Local thickness herein may be understood as the thickness of the first blank along positions of the weld path where the first and second blanks do not overlap, and as the combined thickness of the first and second blanks where the blanks overlap.

In preferred examples, the oscillating movement of the welding path has a frequency between 70 Hz and 500 Hz, specifically between 100 and 300 Hz. Said oscillating movement preferably has an amplitude of between about 0.5 mm and 2 mm. The laser may have a circular spot with a diameter size ranging between 0.2 mm and 1 mm, specifically between 0.3 mm and 0.8 mm.

The amplitude of the oscillating movement may be determined depending on the thickness of the blanks. In particular, the amplitude of the oscillating movement may be increased if the thickness of the blanks to be joined increases. An increase in oscillating frequency can increase the homogeneity of power distribution and heat throughout the weld and thus have a positive effect on the reduction of cracks. On the other hand, an increase in oscillating frequency can lead to an excessive evaporation of the material, especially the volatile chemical components of a material, which may cause a deterioration of the weld integrity. Laser power modulation may be used to at least partly compensate for this.

It has been found that the control of the lateral offset of the laser spot location against the edge location over the upper surface of the lower metal blank affects the quality of the welds as well. The oscillating movements substantially transverse to the welding direction define a midline of oscillation, and in some examples a lateral offset of the midline of oscillation with respect to an edge of the second blank is between 0.1 mm and 1.0 mm.

In preferred embodiments, the aluminum material of at least one of the first and second blanks is an aluminum alloy selected from a group comprising 5000, 6000 and 7000 series aluminum alloys. Specifically, the aluminum material of at least one of the first and second blanks can be selected from the following group: AA5082, AA5083, AA5182, AA5183, AA5754, AA5454, AA6005, AA6022, AA6016, AA6451, AA6111, AA6014, AA6501, AA6181, AA6061, AA6021, AA7204, and their variants.

Typically, the oscillating movements of the welding path may comprise different beam motions such as spiralling or circular movement around a central point, a wobbling movement or a weaving (zig-zag) movement along the weld direction or a combination thereof. In some examples, the movement along the welding direction, and the movement along a direction transverse to the welding direction both are oscillating movement. The movement along the welding direction may have a constant linear speed superimposed on such an oscillating movement. The result of such a combination is a weaving pattern of successive elliptical or circular loops.

In some examples, the oscillating movements transverse to the welding direction follow a substantially sinusoidal pattern. In some other examples, the oscillating movements transverse to the welding direction follow a substantially circular pattern. The different oscillating motions affect the local speed along the weld path and laser power may be modulated to compensate thereof.

In some examples, the movement along the welding direction is a linear movement of substantially constant speed. In some other examples, the movement along the welding direction comprises a combination of a constant forward movement and an oscillating movement. An oscillating movement along the welding direction can improve mixing in the weld zone.

In some examples, the movement along the welding direction comprises a constant forward movement coinciding with a first oscillating movement transverse to the welding direction, and a rearward movement after the first oscillating movement transverse to the welding direction. With such a welding path, the rearward movement along a midline of the transverse oscillation has been found to stabilize the weld pool.

In some examples, the methods of joining may also include a process of cleaning the first and the second blanks before placing them to the welding processes herein described. In particular, the cleaning process comprises a pulse laser cleaning of the surface of the first and second blank, including the welding surface; at a frequency of 10 to 50 kHz, and a scanning velocity of 1.000 mm/sec to 2.500 mm/sec, wherein the pulse duration is ranging between 25 ns and 50 ns. Cleaning the first and second blanks can significantly reduce the porosity of the resultant weld.

In some examples, the methods may further comprise, after joining the first and second blanks, a treatment of the blanks with a laser for improving the surface aspect of the blanks. Such a treatment with a laser may be beneficial e.g. for posterior painting.

Typically, the methods of the present invention are done without using a filler wire or other filler material. It is known that the use of filler wire during the welding process in adequate amount of specific chemical components can avoid the risk of creating porosities and hot cracks. However, it is well known that the addition of an external filler material to the welding process increases the cost and the complexity to the welding process. It has been found that by using the methods of the present invention, these drawbacks have been solved without using any external filler material.

In another aspect, the present invention also provides a process of modulating a laser power distribution during a laser welding of a first blank and a second blank, both are made of aluminum material, the process comprises a) placing the first and second blanks in a lap joint configuration, b) defining a welding edge location by seam tracking the welding path, c) positioning a lateral offset of the laser spot location against the edge location over the upper surface of the lower metal blank between 0.1 mm and 1.0 mm, and d) moving a laser following an oscillating pattern with a frequency between 50 Hz to 1500 Hz and an amplitude of 0.3 mm to 3.0 mm.

In preferred examples, the laser power modulation is a function of a speed of a laser spot along the welding path. Specifically, the laser power modulation may be both a function of the speed of the laser spot and local thickness of the material under the laser spot.

BRIEF DESCRIPTION OF THE DRAWINGS

Non-limiting examples of the present disclosure will be described in the following, with reference to the appended drawings, in which.

DETAILED DESCRIPTION

Figure 1A:
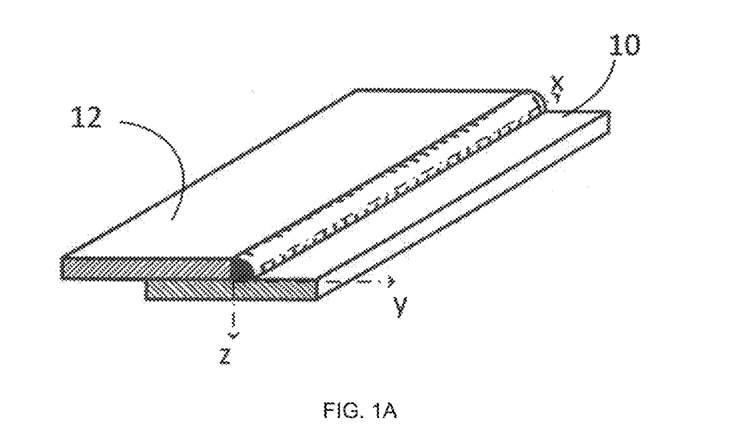
FIGS. 1A-1C illustrate a configuration for laser welding of two blanks in an edge fillet joint of two blanks, wherein one of the blanks is placed and partially overlaps the other blank.
Figure 1B:
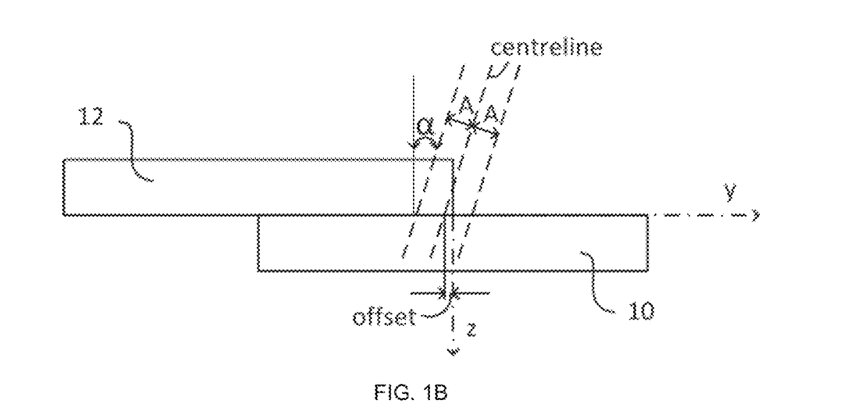
Figure 1C:
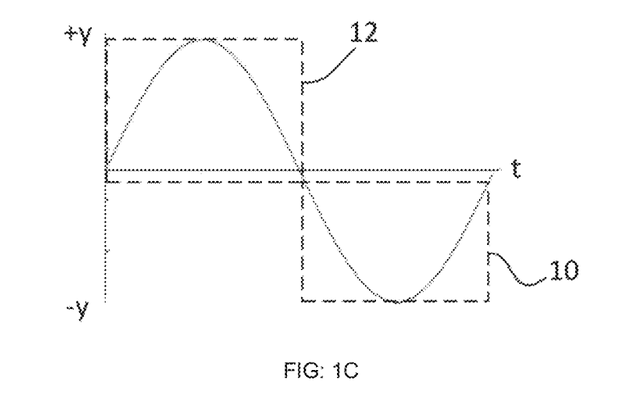

FIGS. 1A-1C illustrate a configuration for laser welding of two blanks, wherein one blank is placed on top of another and partially overlap. This specific example relates to a fillet joint at the edge of the top blank.

FIGS. 1A and 1B are used to illustrate some terminology and Cartesian coordinate systems which will be used in the present disclosure. FIG. 1A illustrates a first 10 and a second blank 12. The second blank 12 is arranged in parallel with the first blank 10 but is partially arranged on top of the first blank. The second blank 12 thus at least partially overlaps with the first blank 10, i.e. a so-called lap joint.

In this specific example, both the first 10 and the second blank 12 have a thickness of 1 mm. The blanks to be welded may generally have a thickness between 0.5 mm and 3 mm, and they may have the same thickness or not.

Suitable aluminum alloys may be chosen for each of the first and second blanks in accordance with circumstances. For automotive applications, the 5000 and 6000 series of aluminum alloys may be suitable. The first and second blanks may be made of the same alloy or of different alloys.

The x-axis may be defined as the axis of the fillet joint, as shown in FIG. 1A. The welding direction thus generally coincides with the x-axis. The thickness of the blanks may be defined along the z-axis. The y-axis is perpendicular to both the x and the z-axes.

During welding the upper blank 12 may be fixed in place with respect to the lower blank by a clamp mechanism (not illustrated). The distance from the welding seam to the edge of the lower blank 10 is preferably no less than 4 mm, and may in some embodiments be between 5 mm and 12 mm.

In examples of the present invention, a remote laser head may be used. A powerful laser source may be used to generate a laser beam and deliver it through a fiber optic cable. Such a remote laser head can provide a small concentrated heat focal point ("spot"), enabling a precise control of the heat input. In addition, movable mirrors in a scanner optic head may be used to control the position of the spot. By changing the mirror configuration continuously, the laser beam and laser spot may oscillate according to a variety of patterns, e.g. a circular oscillation or sinusoidal oscillation.

In some examples, a fiber laser is used, which is a laser in which the active gain medium is an optical fiber doped with rare-earth elements such as ytterbium, and/or others. In other examples, different lasers may be used. The laser power in examples of the present invention may generally be between 2 kW and 10 kW and specifically between 4 kW and 6 kW.

In accordance with examples of the invention, the spot of the laser beam may perform a movement that is a combination of a component along the weld direction (x-axis) and a component transverse to this direction (y-axis). The component along the y-axis is an oscillation transverse to the welding direction. The amplitude of the oscillation along the y-axis is illustrated in FIG. 1B.

A laser beam will be directed to the blanks with an angle α with respect to the vertical, as may be seen in FIG. 1B. The angle α may typically be in range between 0° and 45°.

The centreline or midline of the transverse oscillation in this example does not exactly coincide with the edge of the upper blank, but rather the centreline has an offset in the y-axis as may be seen in FIG. 1B. The offset is defined as the distance between the point where the centreline crosses with the top surface of the lower blank and the edge of the upper blank.

With such an offset, as may be seen in FIG. 1C, the oscillation is not entirely symmetric in the sense that the laser spot is located more time in the upper blank 12 than in the lower blank 10.

Figure 2A:
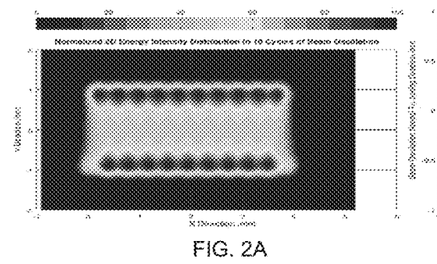
FIGS. 2A-2F illustrate the heat distribution along a weld when using an oscillating laser beam with different oscillation patterns.

FIG. 2A illustrates the energy or heat distribution along a weld using an oscillating weld beam. The heat distribution may be determined by taking into account a thermal history of each point along the weld path. The heat received in a point of the weld path can include heat received directly from the laser beam and heat received indirectly through conduction, when the laser spot is relatively close.

Figure 2B:
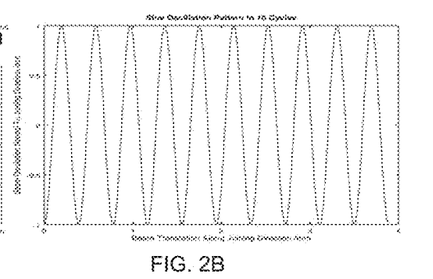

The oscillation pattern in this example is a sinusoidal oscillating along the y-direction, with a substantially constant speed along the x-direction, as may be seen in FIG. 2B. The oscillation of the weld beam establishes a certain mixing in the weld and is therefore helpful in providing a strong joint. However, it may be seen that there are significant concentrations of energy, i.e. heat along the outer edges of the weld. The inventors have concluded that these concentrations of heat provide a potential source of defects.

Figure 2C:
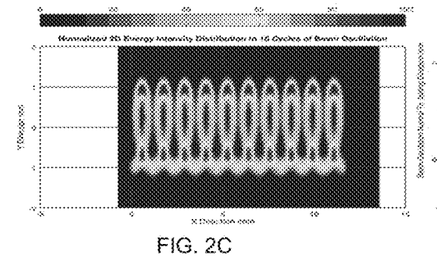
Figure 2D:
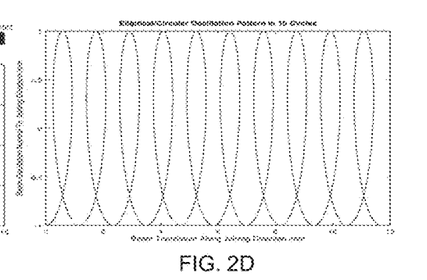
Figure 2E:
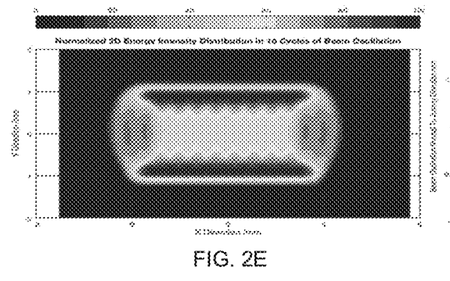
Figure 2F:
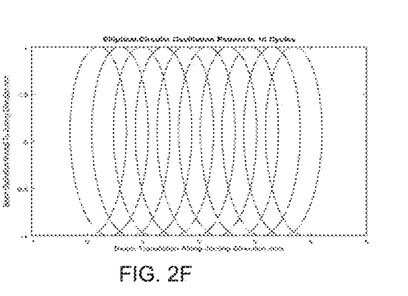

FIGS. 2D and 2F illustrate welding beam patterns which have oscillations in the weld direction (superimposed on a linear speed along this direction) and oscillations in the transverse direction. The main difference between the two patterns is the frequency of oscillation in the transverse direction. It may be seen in FIGS. 2C and 2E that an increased oscillation frequency in the transverse direction leads to a homogenization of the energy distribution in the longitudinal direction of the weld. However, both in FIGS. 2C and 2E, heat concentrations may be found close to the edge of the weld path i.e. close to maximum amplitude of the transverse oscillation.

Without wishing to be bound to theory, it is believed that the concentrations of energy can be linked to the instantaneous speed of the weld spot. I.e. when the instantaneous speed of the weld spot is low, a concentration of energy occurs. In this regard, it is important to note that the instantaneous speed may be a complex function of linear weld speed along the weld direction, oscillation transverse to the weld direction (which may e.g. be circular, elliptical, sinusoidal) and oscillation along the weld direction (which may also be e.g. sinusoidal).

In examples of the present invention, the linear speed along the weld direction may be between 3 m/min and 15 m/min, and specifically between 3 m/min and 10 m/min, and more specifically between 4 m/min and 8 m/min.

It has been found that the absolute value of the speed, i.e.

$v=\sqrt{v_x^2+v_y^2}$ is the most significant factor with respect to energy distribution homogeneity for a given thickness of material welded.

In the present disclosure, it is therefore proposed to vary the laser power to provide a more homogeneous energy distribution. In one example, it is proposed to vary laser power as a function of the instantaneous speed of the laser spot.

In portions of the welding path, the laser spot is positioned in the overlap, i.e. where the second blank is placed on top of the first blank. In other portions of the welding path, the laser spot is positioned on the first blank. When the laser spot is on the second blank, the heat of the laser is distributed to more surrounding material because there is more material to absorb the heat. This preferably is also taking into account for the modulation of the laser power.

In a simulation to calculate laser heat delivered to each point of a weld path or weld pool, a period of time may be taken into account for each point during which it receives direct heat or indirect heat. All the heat delivered to each point of the weld may preferably be substantially constant. By avoiding local hot pockets (and also other colder areas), defects and particularly hot cracks can be reduced.

In a simulation, several assumptions may be made to calculate a suitable laser power modulation that ensures a substantially homogeneous heat distribution. E.g. one assumption may be with respect to an ambient temperature. Another assumption may be of a constant thermal conductivity. In case the blanks are made from different materials, such an assumption may be adapted. A further assumption may be made with respect to the amount of material surrounding a laser spot that receives heat indirectly. One assumption may be that the amount of material corresponds to a "local thickness". The local thickness may be the thickness of the first blank (in those portions of the weld path that the laser beam is located on the first blank) and to be the sum of the thickness of the first and second blanks (in those portions of the weld path that the laser beam is located on the second blank).

It is noted in this respect that the absolute laser power along the weld path is not as important as the relative laser power in one point with respect to another. The depth of penetration of a weld will vary with the absolute value of laser power, but the heat distribution is affected more by the relative variation along the weld path.

In a specific example, the product of laser power and speed divided by a local thickness is maintained substantially constant for points, and preferably for all points, along the weld path. The product of laser power and speed, divided by a local thickness is a good indicator of accumulated heat in each point.

Accumulated heat being substantially constant may preferably mean that the accumulated heat in simulation or in actual welding varies less than 20% around a mean value along at least 75% of the welding path. And more preferably means that the accumulated heat in simulation or in actual welding varies less than 15% around a mean value along at least 85% of the welding path.

Figure 3A:
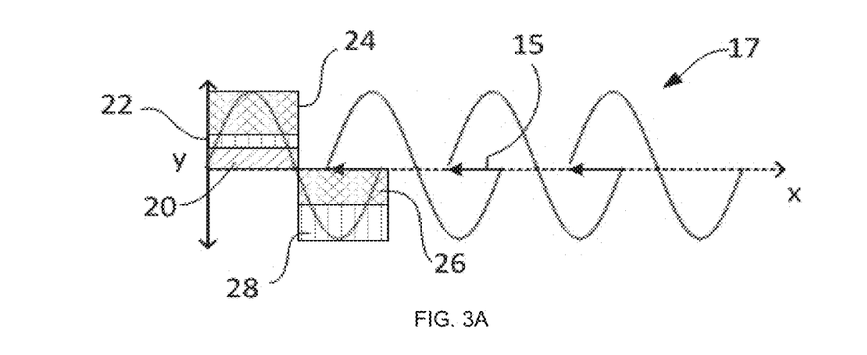
FIGS. 3A and 3B illustrates a power modulation in a welding method according to an example of the invention.
Figure 3B:
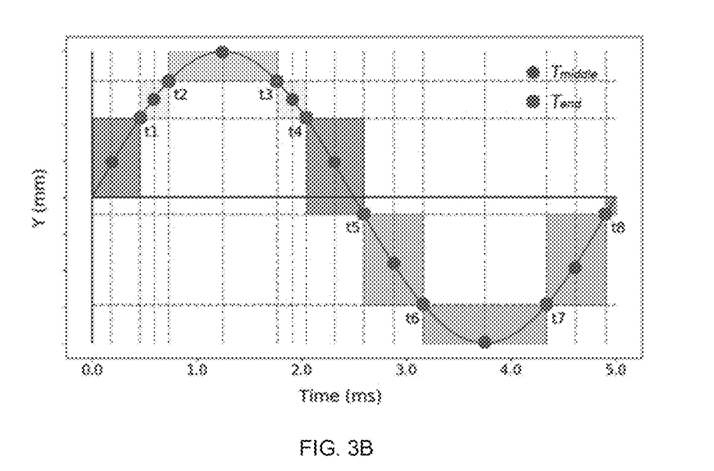

FIGS. 3A and 3B illustrate a laser power distribution in a welding method according to different examples of the invention. A continuous variation of laser power to maintain a substantially constant heat distribution may be complicated to implement. Instead several different levels of laser power may be established for different stretches along the weld pattern.

FIG. 3A schematically illustrates a laser movement 17, comprising a transverse oscillation in combination with a linear constant movement along the weld direction for one transverse oscillation. Between a first transverse oscillation and a second oscillation, a rearward movement 15 along the weld direction takes place. The, another sinusoidal movement follows. It has been found the rearward movements indicated with arrows help to stabilize the weld pool and improve the weld.

Along the weld path, the laser power may be varied. In this particular example, e.g. block 20 indicates a laser power between 70 and 80% of the maximum laser power along the weld path. Blocks 22 indicates a laser power between 50 and 60% of the maximum laser power, and block 24 indicates a laser power of 80-90% of the maximum laser power.

Block 26 in this particular example indicates a laser power of 80-90% of the maximum laser power, and block 28 corresponds to a laser power of 90-100% of the maximum laser power. It may be seen that laser power levels are higher when the laser is positioned on the second blank 12 (i.e. on the overlap) than when the laser is position on the first blank 10. Because of the different "local thickness", the resulting heat distribution will be more homogeneous.

Within the overlap, and within the first blank, the laser power may be varied to account for differences in laser speed. The local speed, as explained before may be composed of a component along the weld direction and a component transverse to the weld direction. Further away from the x-axis (the midline of the transverse oscillation), the speed of movement of the laser may be lower in the case of a sinusoidal pattern. The laser power may thus be decreased. However, in this particular pattern, with the rearward movement along the x-axis, more heat is introduced in the more central portions of the weld path. As a result, in order to make the heat distribution more homogeneous, the laser power levels may actually be higher further away from the x-axis.

Along the rearward movement 15, the laser power level may be e.g. between 10 and 20% of the maximum laser power level.

In the example shown in FIG. 3B, five different power levels may be employed. An offset towards the upper blank 12 is used in this particular example. The offset in this example is −0.1 mm (0.1 mm in the direction of the upper blank). The thickness of the blanks in this case is 1 mm. In examples of the present invention, the offset may be determined as a function of the thickness of the upper blank and the angle alpha of the laser (see FIG. 1B).

In this example, a sinusoidal oscillation in the transverse direction is shown. For the part of the sinusoidal oscillation in the upper blank, three different power levels are used in this example. For the part of the oscillation in the lower blank, two different power levels are used. 8 time stamps t1-t8 are shown in FIG. 3B.

Figure 3C:
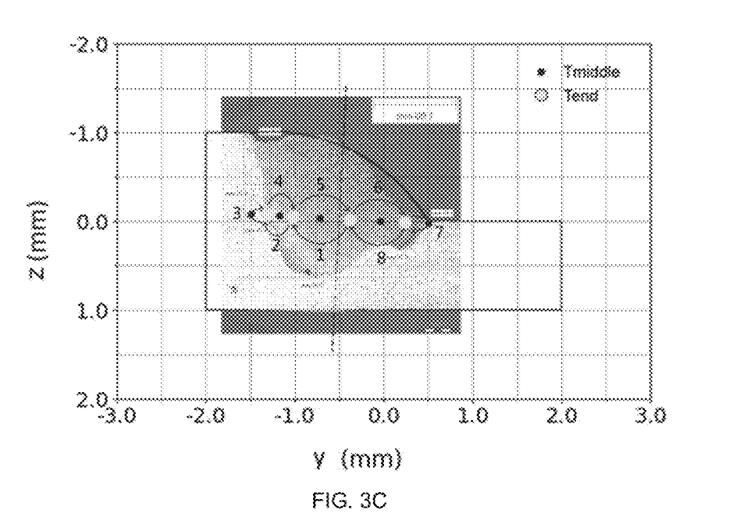
FIG. 3C serves to further illustrate the example of FIG. 3B.

The time stamps t1-t8 may also been in FIG. 3C. FIG. 3C shows a cross-sectional view along a plane perpendicular to the x-axis. Each of the blue dots represents a point in time between two time stamps. It may be seen in FIG. 3C that until t5, the spot of the laser is located in the upper blank, whereas from t5 to t8, the spot is in the lower blank.

Figure 3D:
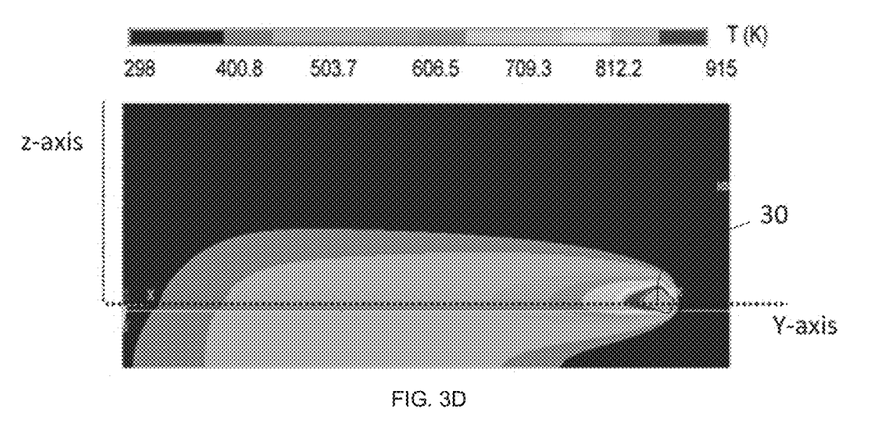
FIGS. 3D and 3E schematically illustrate a heat distribution in a welding method according to an example of the invention.
Figure 3E:
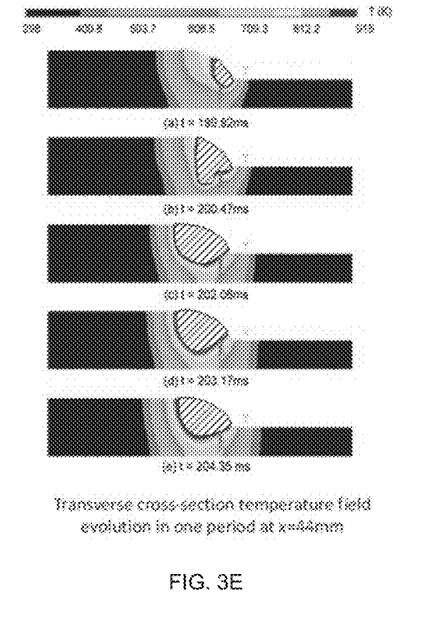

FIGS. 3D and 3E schematically illustrate a heat distribution at different time stamps in a welding method according to an example of the invention. FIG. 3D shows a top view, indicating the laser spot, wherein reference sign 30 indicates the molten weld pool, and behind the laser spot residual heat may be seen.

FIG. 3E shows a cross-sectional view in a plane perpendicular to the x-axis. The hatched portions in each of the figures indicate the molten weld pool. It may be seen that the first part of the oscillation, the laser spot is in the upper blank, and hence heat is concentrated there. In the second part of the oscillation, there is more heating in the lower blank. Note that within a single oscillation, there is a displacement along the x-direction at the same time, so that the heat levels in different parts of the oscillation are not directly comparable to each other.

Figure 4A:
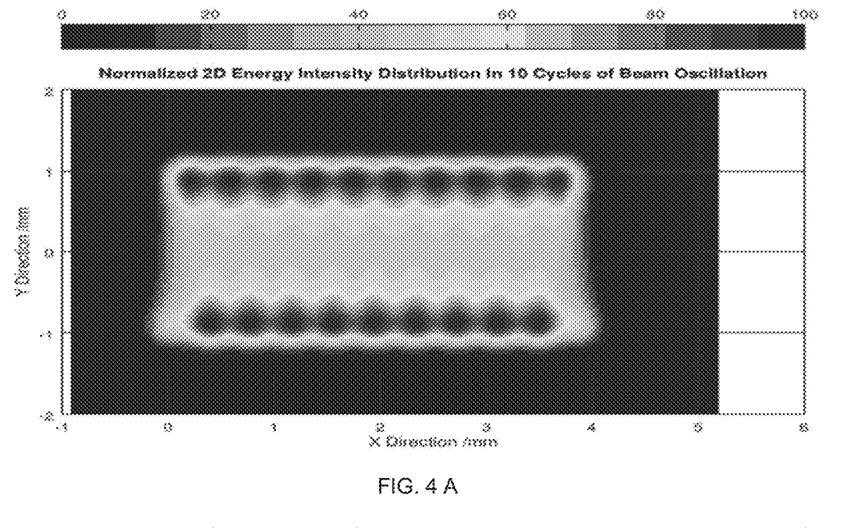
FIGS. 4A-4D illustrate a comparison between the use of an oscillating weld beam with and without power modulation.

FIG. 4A shows a heat distribution in case of a constant speed along the weld direction in combination sinusoidal oscillation transverse to the weld direction without power modulation. It may be seen that along the edges of the weld pool, most heat is concentrated. This is at least partly because at the edges, the speed of the laser beam if lowest.

Figure 4B:
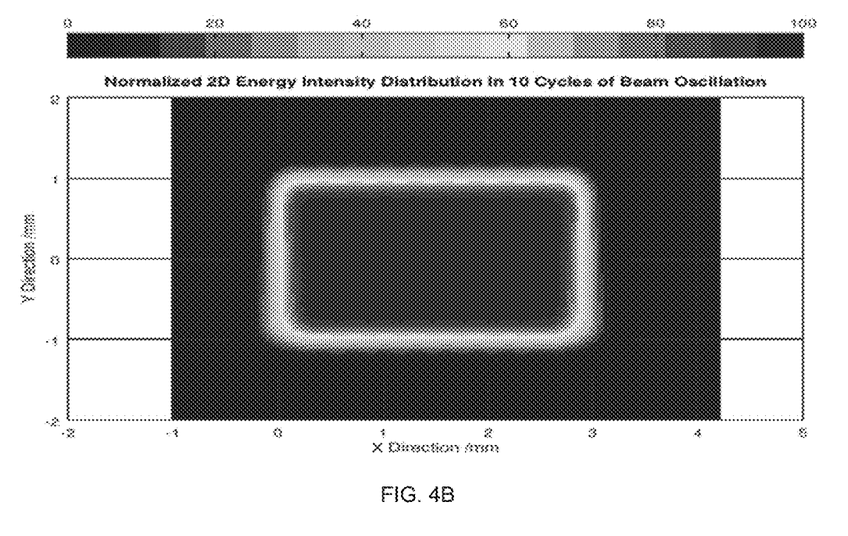

FIG. 4B shows how power modulation of one example of the invention can serve to distribute heat much more homogeneously. As a result, the probability of weld defects is reduced.

Figure 4C:
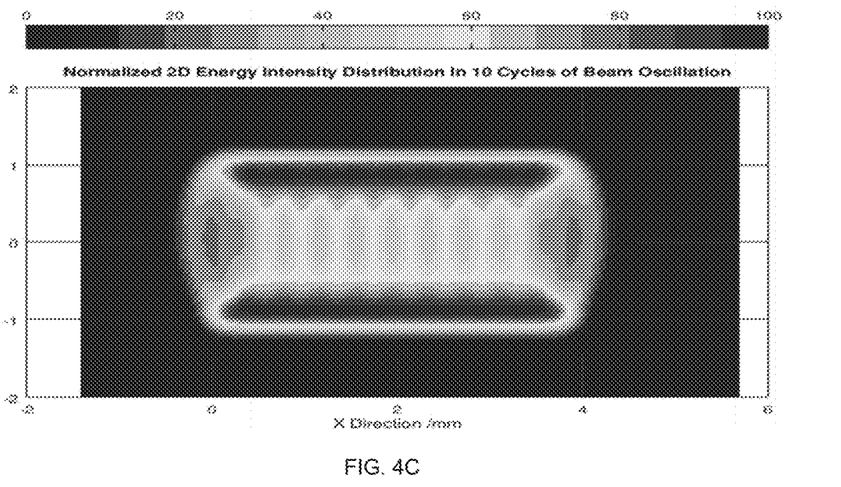
Figure 4D:
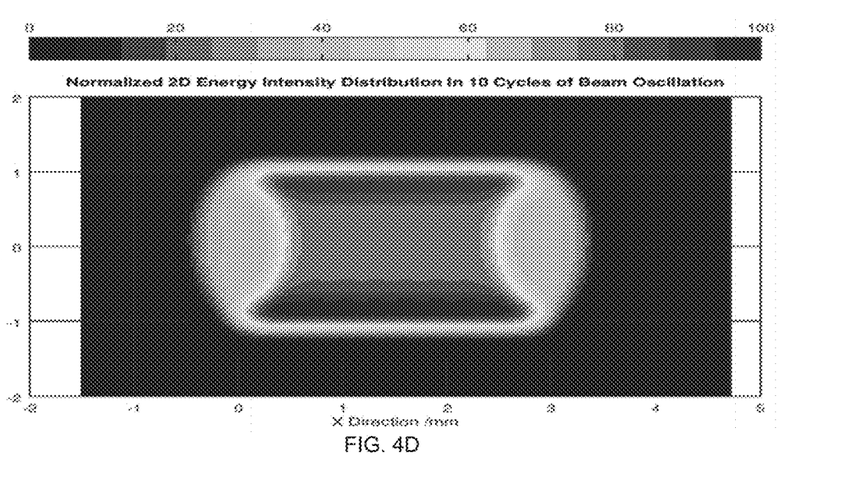

FIG. 4C illustrates a laser heat distribution in a circular laser pattern, wherein the movement along the weld direction is a movement with a constant speed with a superimposed sinusoidal oscillation. The movement transverse to the weld direction is a sinusoidal oscillation. FIG. 4C shows a heat distribution without power modulation, whereas FIG. 4D shows the heat distribution when using power modulation. Again, the heat distribution of FIG. 4D is much more homogenous as a result.

Figure 5A:
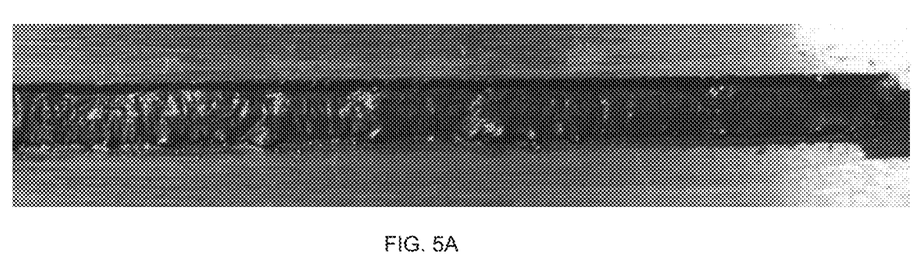
FIGS. 5A and 5B show photos of two examples of weld results according to embodiments of the invention.
Figure 5B:
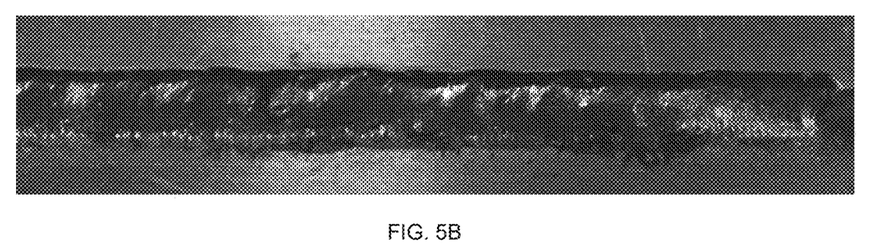

FIGS. 5A and 5B show photos of two examples of weld results according to embodiments of the invention. The difference between FIGS. 5A and 5B is that in FIG. 5B, after welding an additional surface treatment has been performed. The additional surface treatment can increase the smoothness and aesthetic aspects of the outer surface.

The additional surface treatment may comprise laser scanning of the surface. Laser scanning of this type can serve to provide a surface finish after painting.

Figure 6A:
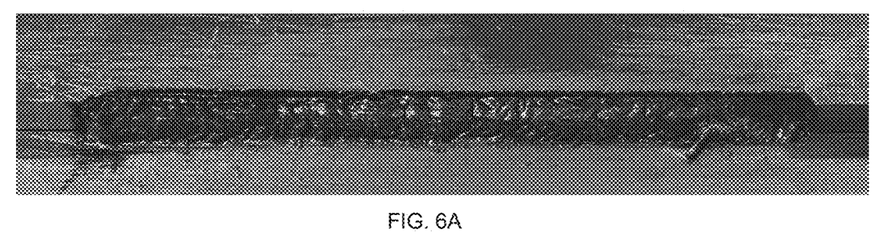
FIGS. 6A and 6B show examples of weld results according to different embodiments of the invention.
Figure 6B:
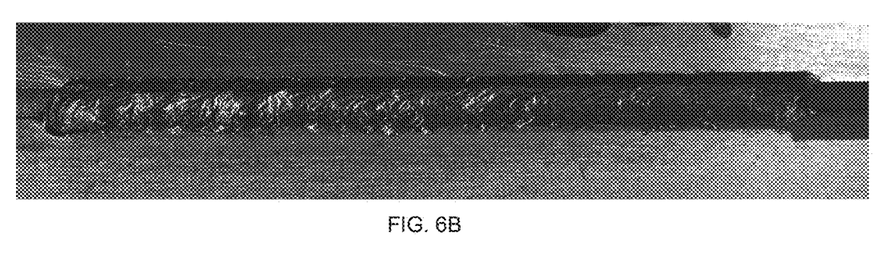

FIGS. 6A and 6B show examples of weld results according to different embodiments of the invention. In FIG. 6A, the result of a laser pattern comprising a sinusoidal oscillation transverse to the weld direction in combination with a constant speed of movement along the weld direction. FIG. 6B shows the resultant weld with a laser pattern according to FIG. 3A, including a rearward movement along the weld direction in between transverse oscillations. Even though both welds are satisfactory, the weld of FIG. 6B is somewhat smoother.

Figure 7A:
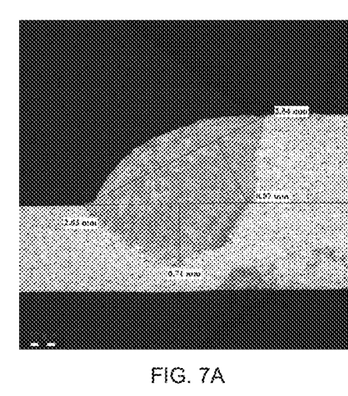
FIGS. 7A-7C show examples of weld results obtained by methods according to the present invention.
Figure 7B:
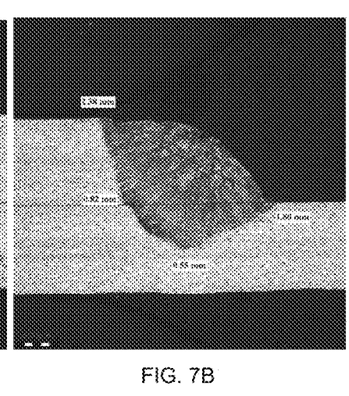
Figure 7C:
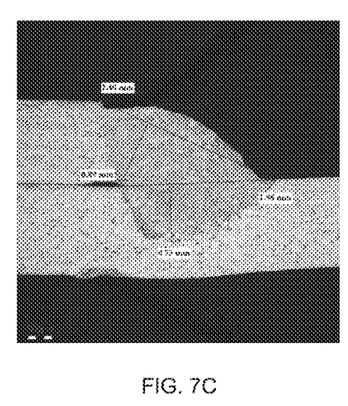

FIGS. 7A-7C illustrate cross-sectional views of three welds that are the result of welding methods according to the present invention. All three views show a uniform weld penetration and no, or very few, defects.

Figure 8:
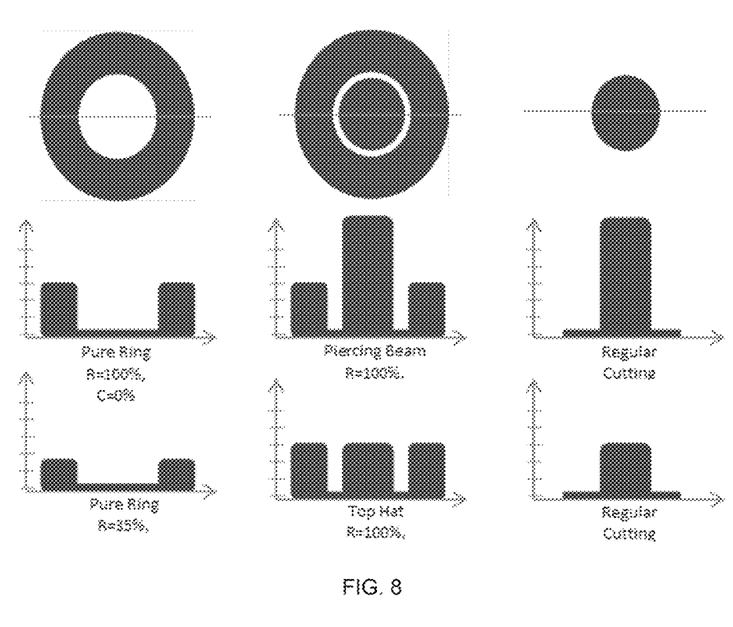
FIG. 8 illustrates a further example of a laser spot that may be used in examples of the present invention.

A further embodiment of the present invention is shown in FIG. 8. In addition to laser beam oscillation and laser power modulation, in the example of FIG. 8, a dual laser spot may be used. The laser spot comprises a first portion and a second portion, and the laser power level of the first and second portions can be individually controlled.

As shown in FIG. 8 the first portion may be a central circle, and the second portion may be a ring surrounding the central circle. Apart from varying the laser power of the dual spot (including both the inner and the outer spot), the laser power may be varied and freely distributed between the inner central spot and the outer annular spot.

According to an example, the diameter of the central inner spot may be 70 microns. The inner diameter of the ring may be 100 microns, and the outer diameter may be 180 microns.

As shown in FIG. 8, with the dual spot according to this example, a spot may be varied between only the outer ring, only the central circle, and combination of both the circle and ring.

As illustrated in FIG. 8, the power levels may be adapted between the inner and outer spot. The central spot may have a percentage of between 30 and 80% of the given laser power, and preferably around 60% and 80% of the total laser power. The outer ring spot may thus have a percentage of between about 20 and 40% of the laser power at any given moment.

This high flexibility in power configuration allows creating a first preheating temperature in the ring preparing for a stable welding process. The preheating effect from the outer ring increases the wettability of the process such that the surface of the joint is smoother compared to conventional laser welding processes, which is in a single ring mode. Further, the outer ring also helps to remove contamination in the surface.

In any of the methods disclosed herein, pulse laser cleaning may be applied prior to welding. It has been found that pulse laser cleaning can also help to reduce weld defects as impurities can be avoided in the weld pool.

In any of the methods disclosed herein, a shield gas may be used. Shield gas protects the joint during the welding process against contamination from atmosphere, reduce porosity. It may also be used to alter the temperature gradient of the liquid metal pool during laser welding process to reduce the hot crack tendency. As shield gases, e.g. Argon or Helium may be used.

The examples disclosed herein refer to welding blanks. A blank may generally be regarded a sheet metal which is unfinished, i.e. the blank has to undergo manufacturing steps to arrive at a finished component. Any of the methods of joining disclosed herein may also be applied to aluminium elements or components which may be regarded as finished.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method for joining a first blank and a second blank, wherein both the first and the second blanks are made of an aluminum material, the method comprises:
    placing the first and second blanks for welding, the second blank being placed on top of the first blank and partially overlapping the first blank;
    laser welding, by a laser, the first and second blanks following a welding path wherein,
    the welding path combines a movement along a welding direction and oscillating movements substantially transverse to the welding direction, wherein the oscillating movement has a frequency between 50 Hz and 1500 Hz and an amplitude ranging from 0.3 mm and 3.0 mm, and wherein
    a laser power is varied along the welding path, wherein the laser power is varied such that a product of the laser power and a speed of the laser divided by a local thickness is substantially constant along the welding path, such that accumulated heat in points along the welding path is substantially constant.

2. The method according to claim 1, wherein the laser power is varied between 25%-100% of a maximum laser power level of the laser.

3. The method according to claim 1, wherein the oscillating movement has the frequency between 70 Hz and 500 Hz.

4. The method according to claim 1, wherein the oscillating movement has the amplitude of 0.5 mm-2 mm.

5. The method according to claim 1, wherein the laser has a circular spot with a diameter size of 0.2 mm to 1 mm.

6. The method according to claim 1, wherein the oscillating movements substantially transverse to the welding direction define a midline of oscillation, and a lateral offset of the midline of oscillation with respect to an edge of the second blank is between 0.1 mm and 1.0 mm.

7. The method according to claim 1, wherein the aluminum material of at least one of the first or second blanks is an aluminum alloy selected from a group consisting of 5000, 6000, and 7000 series aluminum alloys.

8. The method according to claim 7, wherein the aluminum material of at least one of the first or second blanks is selected from a group consisting of AA5082, AA5083, AA5182, AA5183, AA5754, AA5454, AA6005, AA6022, AA6016, AA6451, AA6111, AA6014, AA6501, AA6181, AA6061, AA6021, and AA7204.

9. The method according to claim 1, wherein the oscillating movements transverse to the welding direction follow a substantially sinusoidal pattern.

10. The method according to claim 1, wherein the oscillating movements transverse to the welding direction follow a substantially circular pattern.

11. The method according to claim 1, wherein the movement along the welding direction is a linear movement of substantially constant speed.

12. The method according to claim 1, wherein the movement along the welding direction comprises a combination of a constant forward movement and an oscillating movement.

13. The method according to claim 1, wherein the movement along the welding direction comprises a constant forward movement coinciding with a first oscillating movement transverse to the welding direction, and a rearward movement after the first oscillating movement transverse to the welding direction.

14. The method according to claim 1, wherein the first blank and the second blank have previously been cleaned before carrying out the method of joining according to claim 1.

15. The method according to claim 14, wherein the cleaning process comprises a pulse laser cleaning of a surface of the first and second blanks at a frequency of 10 to 50 KHz and a scanning velocity of 1,000 mm/sec to 2,500 mm/sec, and wherein a pulse duration is ranging between 25 ns and 50 ns.

16. The method according to claim 1, further comprising, after joining the first and second blanks, a treatment of the blanks with a laser for improving a surface aspect of the blanks.

17. The method according to claim 1, wherein the joining is done without using a filler material.

18. The method according to claim 1, wherein a laser spot comprises a first portion and a second portion, and wherein a laser power level of the first and second portions is individually controlled.

19. The method according to claim 18, wherein the first portion is a central circle, and the second portion is a ring surrounding the central circle.

* * * * *